United States Patent [19]

Cymbal et al.

[11] 4,278,154
[45] Jul. 14, 1981

[54] VEHICLE FLOOR MOUNTED TRANSMISSION SHIFT LEVER WITH STEERING COLUMN BACKDRIVE LINKAGE

[75] Inventors: William D. Cymbal, Freeland; Dan R. Kimberlin, Frankenmuth, both of Mich.

[73] Assignee: General Motors Corporation, Detroit, Mich.

[21] Appl. No.: 48,892

[22] Filed: Jun. 18, 1979

[51] Int. Cl.³ .............................................. F16D 67/00
[52] U.S. Cl. ................................................... 192/4 A
[58] Field of Search ....................... 192/4 A, 4 R, 4 C; 74/471 R, 473 R, 491, 501 R

[56] References Cited
U.S. PATENT DOCUMENTS

| 3,001,618 | 9/1961 | McCordic et al. | 192/4 A |
| 3,361,234 | 1/1968 | Runyon | 192/4 A |
| 3,590,613 | 7/1971 | Kimberlin et al. | |

Primary Examiner—George H. Krizmanich
Attorney, Agent, or Firm—Donald F. Scherer

[57] ABSTRACT

A floor mounted transmission shift lever is connected to the steering column backdrive and locking mechanism. A separate linkage is connected between the steering column backdrive and the transmission shift control mechanism.

2 Claims, 3 Drawing Figures

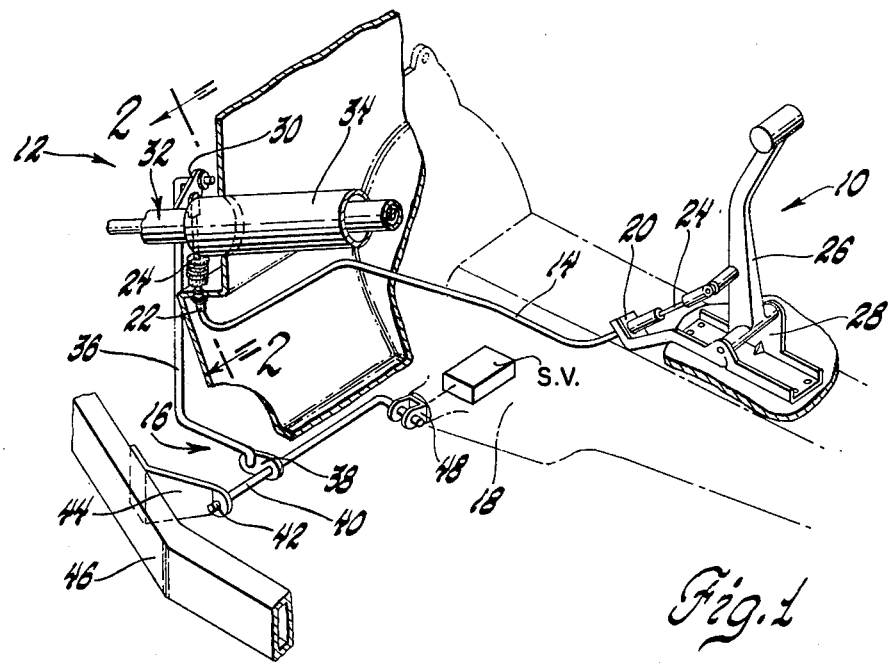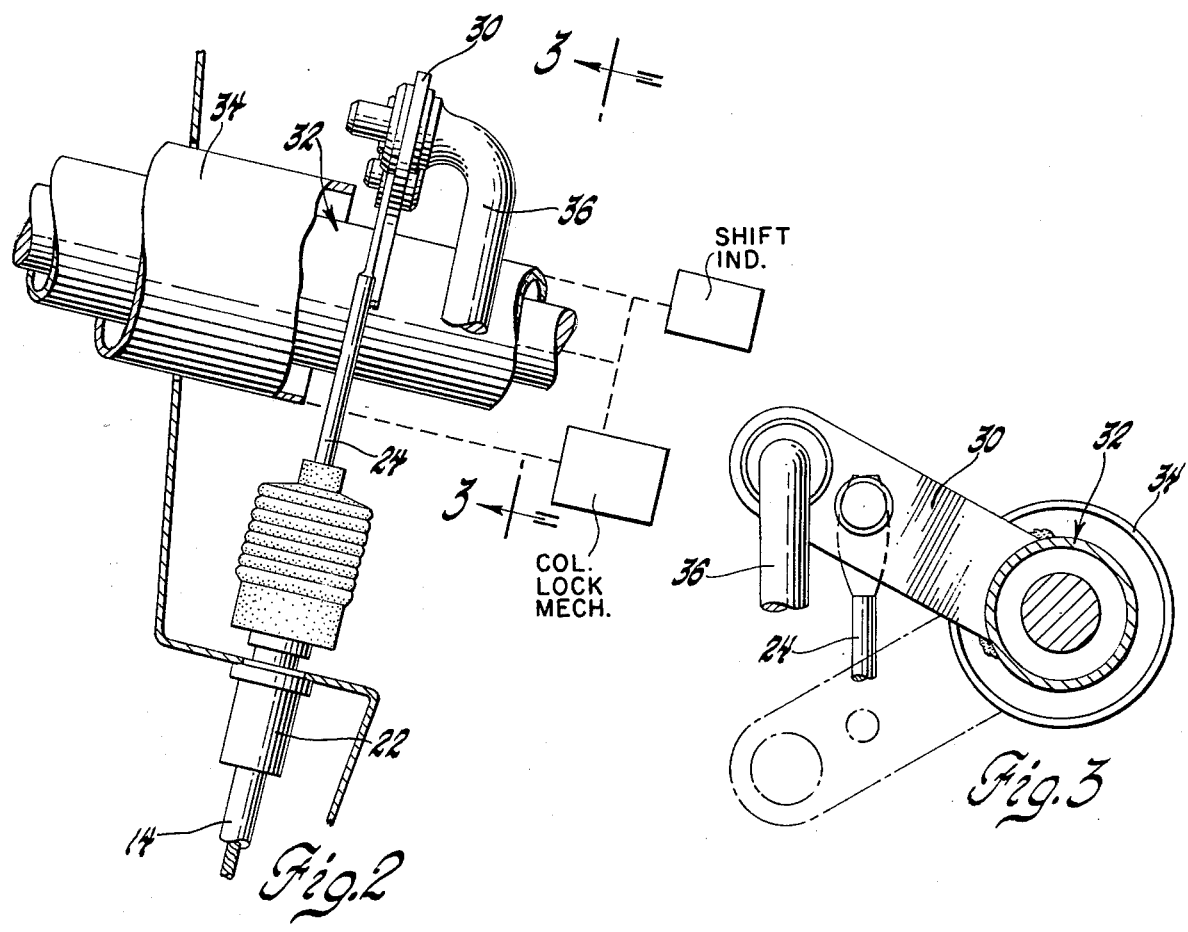

VEHICLE FLOOR MOUNTED TRANSMISSION SHIFT LEVER WITH STEERING COLUMN BACKDRIVE LINKAGE

This invention relates to transmission shift controls and more particularly to floor mounted, manually operated, automatic transmission shift controls with a backdrive connection to the steering column.

Prior art floor mounted transmission shift controls for automatic transmissions generally have a linkage or flexible cable connected directly between the shift lever and the transmission mounted shift control mechanism. In some instances, these transmission shift controls also include a linkage or flexible cable connection from the transmission mounted control to the steering column backdrive. These shift control systems, wherein the locking mechanism of the steering column is used to prevent shifting from the "Park" mode, are not always sufficiently rigid to prevent the shift lever from being forcibly moved from the "Park" location even though the steering column lock mechanism has been actuated.

The present invention prevents excessive loads from being transmitted between the floor mounted shift lever and the transmission mounted shift control by interposing the steering column mounted locking mechanism between these two structures. Manual force applied to the transmission shift lever is absorbed by the steering column backdrive system and cannot be directly imposed upon the transmission mounted shift control mechanism. When the steering column locking mechanism is operated to permit normal vehicle operation, the normal loads imposed on the shift lever will then be transmitted to the shift control mechanism.

It is an object of this invention to provide an improved floor mounted, manually operated shift control mechanism for a vehicle having an automatic transmission.

It is another object of this invention to provide an improved floor mounted, manually operated shift control mechanism in a vehicle having an automatic transmission wherein the shift lever is drivingly connected to the steering column backdrive mechanism which in turn is connected to the transmission shift control mechanism.

A further object of this invention is to provide an improved floor mounted, manually operated shift control mechanism for an automatic transmission wherein the shift lever is drivingly connected to the transmission backdrive mechanism through a flexible cable and wherein the backdrive mechanism is drivingly connected to the transmission shift control through a linkage mechanism.

These and other objects and advantages of the present invention will be more apparent from the following description and drawings in which:

FIG. 1 is a diagrammatic view showing the transmission shift control system as mounted in a vehicle;

FIG. 2 is a view taken along line 2—2 of FIG. 1; and

FIG. 3 is a view taken along line 3—3 of FIG. 2.

There is seen in FIG. 1, a conventional floor mounted shift control lever assembly generally designated 10, which is drivingly connected to a conventional steering column mounted backdrive generally designated 12 by a flexible cable 14. The steering column backdrive mechanism 12 is connected by a linkage system generally designated 16 which is connected to operate a conventional manual shift valve S.V. which is disposed within a transmission 18. The flexible cable 14 may be constructed in accordance with the teaching of U.S. Pat. No. 3,752,008 so as to be adjustable between its connections at ends 20 and 22. The internal cable member of the flexible cable, designated 24, is connected to a pivotally mounted manual transmission lever 26. The lever 26 is pivotally mounted on a bracket 28 which is secured to the vehicle floor pan, not shown, in a conventional manner. The cable 24 is also connected to a lever 30 which is a component in the steering column backdrive 12. The lever 30 is connected to a conventional transmission shift control tube 32 which extends concentric with a conventional steering column mast jacket 34.

The transmission shift control tube 32 is connected to a steering column locking mechanism which may be constructed in accordance with U.S. Pat. No. 3,490,255 issued Jan. 20, 1970, and assigned to the assignee of the present application. Such steering column locking mechanisms are well-known so that a description of the mechanism is not considered necessary since those familiar with the art will be well aware of their operation and structure. It is sufficient to note that these steering column locking mechanisms are operable to prevent rotation of the shift tube 32 when the vehicle ignition key is moved to the "Lock" position.

Also connected to the lever 30 is one end of a link 36 which has the other end thereof connected to a bell crank 38. The bellcrank 38 is secured to a rod 40 which has one end 42 rotatably mounted in a bracket 44 secured to a vehicle frame 46. The other end of rod 40 is connected to a bracket 48 which is rotatably mounted in the transmission 18 and is operatively connected in a well-known manner to the transmission manual shift control valve S.V.

When the steering column backdrive mechanism 12 is locked, any manual force exerted on the shift lever 26 will be transmitted through cable 24 to the lever 30. The lever 30 will, in most instances, rotate slightly to accommodate the production tolerances which are present. However, this rotation will not permit the linkage 16 to move an amount sufficient to permit the transmission control to be moved from the "Park" position. It should also be noted that the manual forces exerted on the manual lever 26 and therefore cable 24, cannot be transmitted directly to the transmission shift linkage 16 as they will be absorbed by the steering column backdrive and locking mechanism. Therefore, it should be apparent that the above described control mechanism prevents the transmission control from being forcibly removed from the "Park" position when the steering column locking mechanism has been actuated.

The embodiments of the invention in which an exclusive property or privilege is claimed are defined as follows:

1. An improvement in floor mounted transmission control mechanisms for a vehicle having a steering column backdrive and a locking mechanism, and a transmission shift control, wherein the improvement comprises; a drive transmitting means connected between the floor mounted transmission control mechanism and the steering column backdrive, and another drive transmitting means connected between the steering column backdrive and the transmission shift control, whereby manual input motion must result in motion of the steering column backdrive before the motion is transmitted to the transmission shift control.

2. An improvement in floor mounted transmission control mechanisms for a vehicle having a steering column backdrive with a locking mechanism and a transmission shift control, wherein the improvement comprises; a flexible drive transmitting cable connected between the floor mounted transmission control mechanism and the steering column backdrive, and a rigid drive transmitting linkage connected between the steering column backdrive and the transmission shift control, whereby manual input motion through said flexible drive transmitting cable must result in motion of the steering column backdrive before the motion is transmitted to the transmission shift control.

* * * * *